United States Patent
Loktev et al.

(10) Patent No.: US 10,197,114 B2
(45) Date of Patent: Feb. 5, 2019

(54) DETERMINATION OF A CLUTCH TEMPERATURE

(71) Applicant: Schaeffler Technologies AG & Co. KG, Herzogenaurach (DE)

(72) Inventors: Denis Loktev, Bühl (DE); Arnim-Sebastian Rottach, Ravensburg (DE); Martin Vornehm, Bühl (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 232 days.

(21) Appl. No.: 15/123,216

(22) PCT Filed: Feb. 20, 2015

(86) PCT No.: PCT/DE2015/200085
§ 371 (c)(1),
(2) Date: Sep. 1, 2016

(87) PCT Pub. No.: WO2015/131892
PCT Pub. Date: Sep. 11, 2015

(65) Prior Publication Data
US 2017/0074334 A1 Mar. 16, 2017

(30) Foreign Application Priority Data
Mar. 3, 2014 (DE) .......... 10 2014 203 803

(51) Int. Cl.
*F16D 48/06* (2006.01)
*B60K 6/38* (2007.10)
*B60W 20/00* (2016.01)

(52) U.S. Cl.
CPC ........... *F16D 48/06* (2013.01); *B60K 6/38* (2013.01); *B60W 20/00* (2013.01);
(Continued)

(58) Field of Classification Search
CPC .......... F16D 48/06; F16D 2300/02; F16D 2300/021; F16D 2500/30405; B60W 20/00
See application file for complete search history.

(56) References Cited

U.S. PATENT DOCUMENTS

2006/0036359 A1* 2/2006 Thor ............... F16H 61/12
701/67
2006/0161326 A1* 7/2006 Jaeggle ............ F16D 48/06
701/67
(Continued)

FOREIGN PATENT DOCUMENTS

CN 101734153 A 6/2010
CN 102777513 A 11/2012
(Continued)

OTHER PUBLICATIONS

Chinese Office Action related to CN106062405A, 7 pgs., dated Nov. 16, 2017 by the Chinese Patent Office.

*Primary Examiner* — Edwin A Young
(74) *Attorney, Agent, or Firm* — Lekeisha M. Suggs

(57) ABSTRACT

A hybrid drive including a first drive motor coupled by a clutch to a shaft, and a second drive motor coupled rigidly to the shaft. A method for determining the temperature of the clutch in the hybrid drive includes the steps of: determining a temperature of the clutch; determining a temperature of the clutch housing; determining the temperature difference between the clutch and the clutch housing; determining the heat conductivity between the clutch and the clutch housing, wherein the heat conductivity is determined as a function of the rotational speed of the first drive motor and the rotational speed of the second drive motor; determining the heat flow between the clutch and the clutch housing on the basis of the product of the heat conductivity and the temperature difference; and adjusting the ascertained clutch temperature on the basis of the ascertained heat flow.

10 Claims, 4 Drawing Sheets

(52) U.S. Cl.
CPC .......... *B60W 2510/0291* (2013.01); *B60W 2510/081* (2013.01); *B60W 2710/029* (2013.01); *B60Y 2200/92* (2013.01); *B60Y 2300/42* (2013.01); *F16D 2300/02* (2013.01); *F16D 2300/021* (2013.01); *F16D 2500/1045* (2013.01); *F16D 2500/1066* (2013.01); *F16D 2500/10412* (2013.01); *F16D 2500/3067* (2013.01); *F16D 2500/30404* (2013.01); *F16D 2500/30405* (2013.01); *F16D 2500/502* (2013.01); *F16D 2500/7043* (2013.01); *Y10S 903/912* (2013.01); *Y10S 903/946* (2013.01)

(56) References Cited

U.S. PATENT DOCUMENTS

2008/0215220 A1\* 9/2008 Winkel ............... B60W 10/02
701/68
2012/0290249 A1 11/2012 Hebbale et al.

FOREIGN PATENT DOCUMENTS

| CN | 102777588 A | 11/2012 |
|---|---|---|
| CN | 102777589 A | 11/2012 |
| DE | 10 2005 061 080 A1 | 7/2006 |
| DE | 10 2005 026 615 A1 | 12/2006 |
| EP | 1888935 A1 | 2/2008 |
| FR | 2 878 619 A1 | 6/2006 |
| JP | 2012-153230 A | 8/2012 |

\* cited by examiner

DETERMINATION OF A CLUTCH TEMPERATURE

BACKGROUND OF THE INVENTION

Field of the Invention

The present invention relates to the determination of a temperature of a clutch. In particular, the invention relates to the determination of the temperature of a clutch for a hybrid drive.

Description of the Related Art

A clutch in a drive train, in particular on board a motor vehicle, is set up to transfer torque between a drive motor and a following component, in particular a transmission, by means of frictional grip or a cohesive frictional grip provided by the clutch. The temperature of the clutch depends to a significant degree on the amount of torque being transferred through it, and how much slip occurs between an input side and an output side of the clutch. Since both those sides are usually rotatable relative to and within a clutch housing, it is difficult to measure the clutch temperature directly. In order to be able nevertheless to provide a warning of excessive clutch temperature, attempts are frequently made to determine the clutch temperature on the basis of other measured variables.

DE 10 2005 061080 A1 discloses a method and a device for assessing a clutch state on the basis of external measurements.

In a hybrid drive, a first and a second drive motor are coupled to a shaft, which provides torque for the drive train. In different operating states the first, the second, or both drive motors can deliver torque to the shaft. Situations can arise in which a calculated determination of the clutch temperature does not keep up well with the actual conditions.

SUMMARY OF THE INVENTION

An object of the present invention is to provide an improved technique for determining the temperature of a clutch for a hybrid drive. The invention fulfills that object by means of a method, a computer program product, and a device.

A hybrid drive includes a first drive motor, which is coupled by means of a clutch to a shaft, and a second drive motor, which is coupled rigidly to the shaft. The method according to the present invention for determining the temperature of the clutch includes the steps of determining a temperature of the clutch, determining a temperature of a clutch housing, determining a temperature difference between the clutch and the clutch housing, determining the heat conductivity between the clutch and the clutch housing, wherein the heat conductivity is determined as a function of the speed of the first drive motor and the speed of the second drive motor, determining the heat flow between the clutch and the clutch housing on the basis of the product of the heat conductivity and the determined temperature difference, and adjusting the ascertained clutch temperature on the basis of the ascertained heat flow.

Advantageously, it is possible to take account of the fact that when the shaft is driven by the second drive motor, the clutch is moved relative to the clutch housing, and consequently an improved exchange of heat is possible. Compared to a known method, in which only the speed of the first drive motor is considered, in this way in particular a cooling off of the clutch when only the second drive motor is operated can be better accounted for. The temperature of the clutch can therefore be determined with improved precision. That enables better control of the heat regulation of the clutch.

In a first variant of the method, the heat conductivity is determined by means of a characteristic map on the basis of the speeds of both drive motors. For example, empirical values can be summarized in a two-dimensional map by means of the influences of both drive motors. That makes it possible to determine the heat conductivity quickly and with little effort and expense.

In another variant of the method, the heat conductivity is determined on the basis of the speed of the first drive motor if the first drive motor is in operation, and otherwise on the basis of the speed of the second drive motor. That method is particularly advantageous if a preferred embodiment of the hybrid drive is present in which the first drive motor includes an internal combustion engine and the second drive motor includes an electrical machine. In that way, the modeling of the influences of the speeds of the first and the second drive motors on the heat conductivity can be simplified.

In one embodiment, it is determined that the first drive motor is in operation if its speed is greater than a predetermined value. That predetermined value is usually below an idle speed of the first drive motor. That makes it possible to ensure that the determination of the heat conductivity is reliably switched over between the speeds of the first and the second drive motors when the first drive motor is shut down or can be considered to be shut down. That makes it possible to take better account of a shut-down or a start-up process of the first drive motor.

The method is preferably repeated multiple times in order to determine the temperature of the clutch continuously. In so doing, the energy input into the clutch that can cause the temperature of the clutch to rise can be taken into consideration. The initial determination of the temperature of the clutch can be made, for example, on the basis of an estimate, in particular on the basis of the temperature of the clutch housing.

In another embodiment, a signal is emitted if the ascertained adjusted clutch temperature is above a predetermined threshold. The signal can be provided with improved reliability on the basis of the improved determination of the clutch temperature. In particular, it is possible to avoid the signal being emitted mistakenly, even though the clutch temperature has already fallen below the threshold value. Conversely, the absence of a signal can also be prevented when the actual clutch temperature already exceeds the threshold value. The hybrid drive can be better protected thereby.

The medium between the clutch and the clutch housing is preferably gaseous. In that case, one speaks in particular of a dry clutch. Properties of the medium, as well as possible unchangeable parameters determined by the architecture of the clutch that can be included in determining the heat flow, can be modulated through constants.

In another embodiment, the clutch is part of a dual clutch. The dual clutch can lead to a dual-clutch transmission, which has two input shafts, one of which is firmly coupled to the second drive motor. The other input shaft can be coupled to the first drive motor by means of a second clutch. Both input shafts of the transmission can act on a joint output shaft, which provides a torque, for example for propelling a motor vehicle. Thus, the method can be better utilized on a progressive hybrid drive with a dual-clutch transmission. Improved control of the hybrid drive, of the transmission, or of a transition between propulsion by means of the first or even second drive motor, can be made possible by the present method.

A computer code product according to the present invention includes program code means for carrying out the described method when the computer program product is executed in a processing device or is stored in a computer-readable data medium.

A device for determining the temperature of the clutch described above for the hybrid drive includes a device for determining the temperature of the clutch, a device for determining the temperature of the clutch housing, a device for determining the speed of the first drive motor, a device for determining the speed of the second drive motor, and a processing device. In that case, the processing device is set up to determine the temperature difference between the clutch and the clutch housing, to determine the heat conductivity between the clutch and the clutch housing depending on the speed of the first drive motor and the speed of the second drive motor, to determine the heat flow between the clutch and the clutch housing on the basis of the product of the heat conductivity and the temperature difference, and to adjust the ascertained clutch temperature on the basis of the ascertained heat flow.

BRIEF DESCRIPTION OF THE DRAWINGS

The invention will now be described in greater detail by reference to the accompanying drawings, in which the drawing figures represent the following.

DESCRIPTION OF THE PREFERRED EMBODIMENTS

Figure 1:
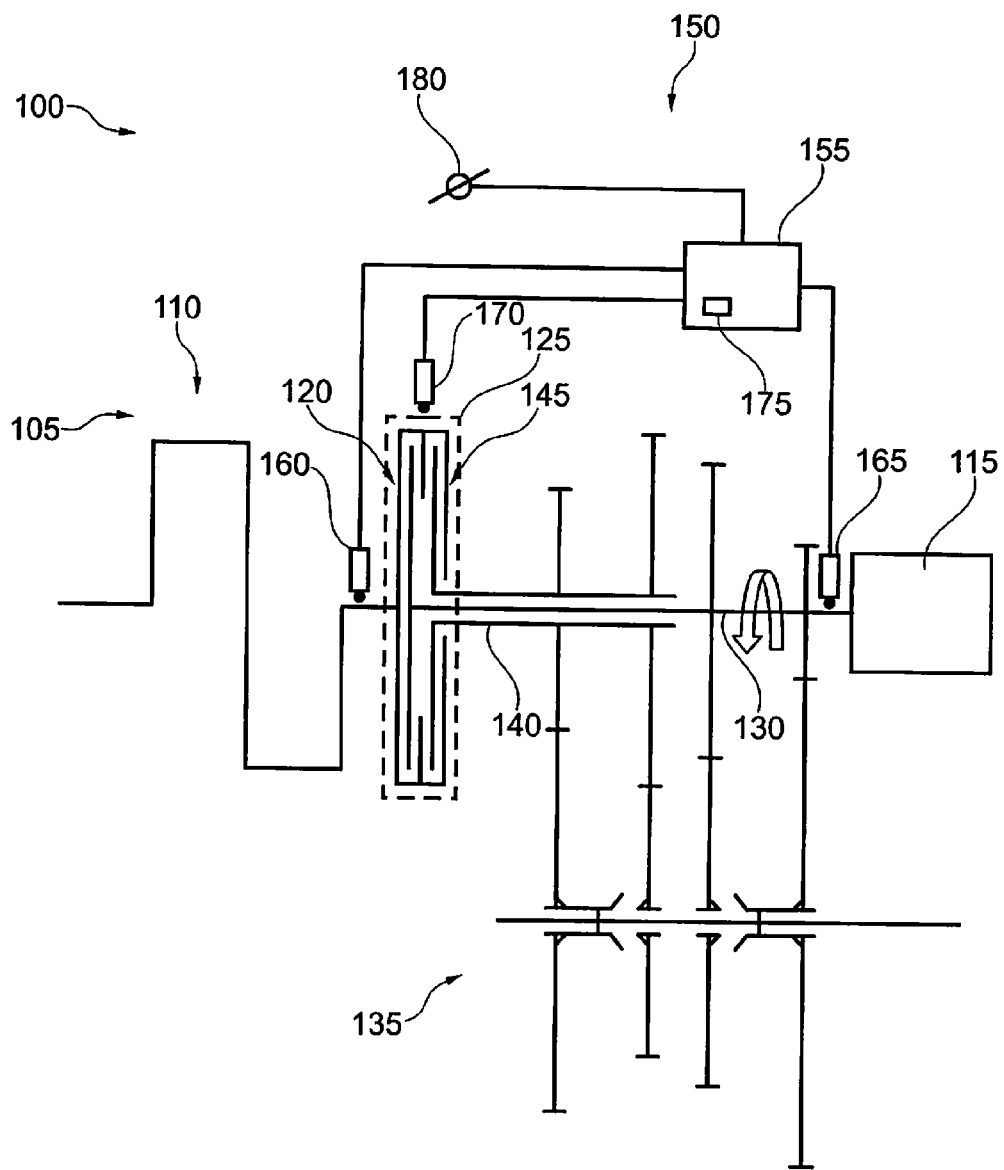
FIG. 1 is a schematic depiction of a device for determining a clutch temperature in a hybrid drive for a motor vehicle.

FIG. 1 shows a drive train 100, in particular for a motor vehicle. The drive train 100 includes a hybrid drive 105 having a first drive motor 110, a second drive motor 115, and a clutch 120 with a clutch housing 125. The hybrid drive 105 is set up to provide a torque on a shaft 130 that can be used, for example, to propel the motor vehicle.

The first drive motor 110 usually includes an internal combustion engine, in particular one according to the reciprocating-piston principle. The second drive motor 115 preferably includes an electrical machine. The first drive motor 110 is connected to the shaft 130 in a separable arrangement by means of the clutch 120, while the second drive motor 115 is connected rigidly to the shaft 130. The shaft 130 can be an input shaft of the transmission 135, which serves to pass up or pass down, appropriately, the torque provided by the shaft 130. In one embodiment, the transmission 135 is a dual-clutch transmission with a second input shaft 140 that is operatively coupled to the first drive motor 110 by means of an additional clutch 145. In that case, the clutch 120 and the additional clutch 145 are preferably both enclosed by the clutch housing 125.

To determine the temperature of the clutch 120, an arrangement 150 is provided, which includes a processing device 155 that is connected to a plurality of sensing devices. A first, speed sensing device 160 serves to determine the speed of the first drive motor 110, and a second, speed sensing device 165 serves to determine the speed of the second drive motor 115. A third, temperature sensing device 170 serves to determine the temperature of the clutch housing 125. In one embodiment, the processing device 155 includes a temperature-related device 175 for determining the temperature of the clutch 120. That device 175 can be in particular an estimating device, which estimates the temperature of the clutch 120 on the basis of the information from the several sensing devices 160, 165, and 170.

In a different embodiment, the temperature estimating device 175 is separate from the processing device 155. The processing device 155 is preferably connected to an interface 180 through which parameters can be received that relate to the heating of the clutch 120. Those parameters can include, in particular, the degree of actuation of the clutch 120 and the torque transferred via the clutch 120. On the basis of such information, an input of energy into the clutch 120 can be determined, so that a previously determined or estimated temperature of the clutch 120 can be adjusted on the basis of the energy input.

Figure 2:
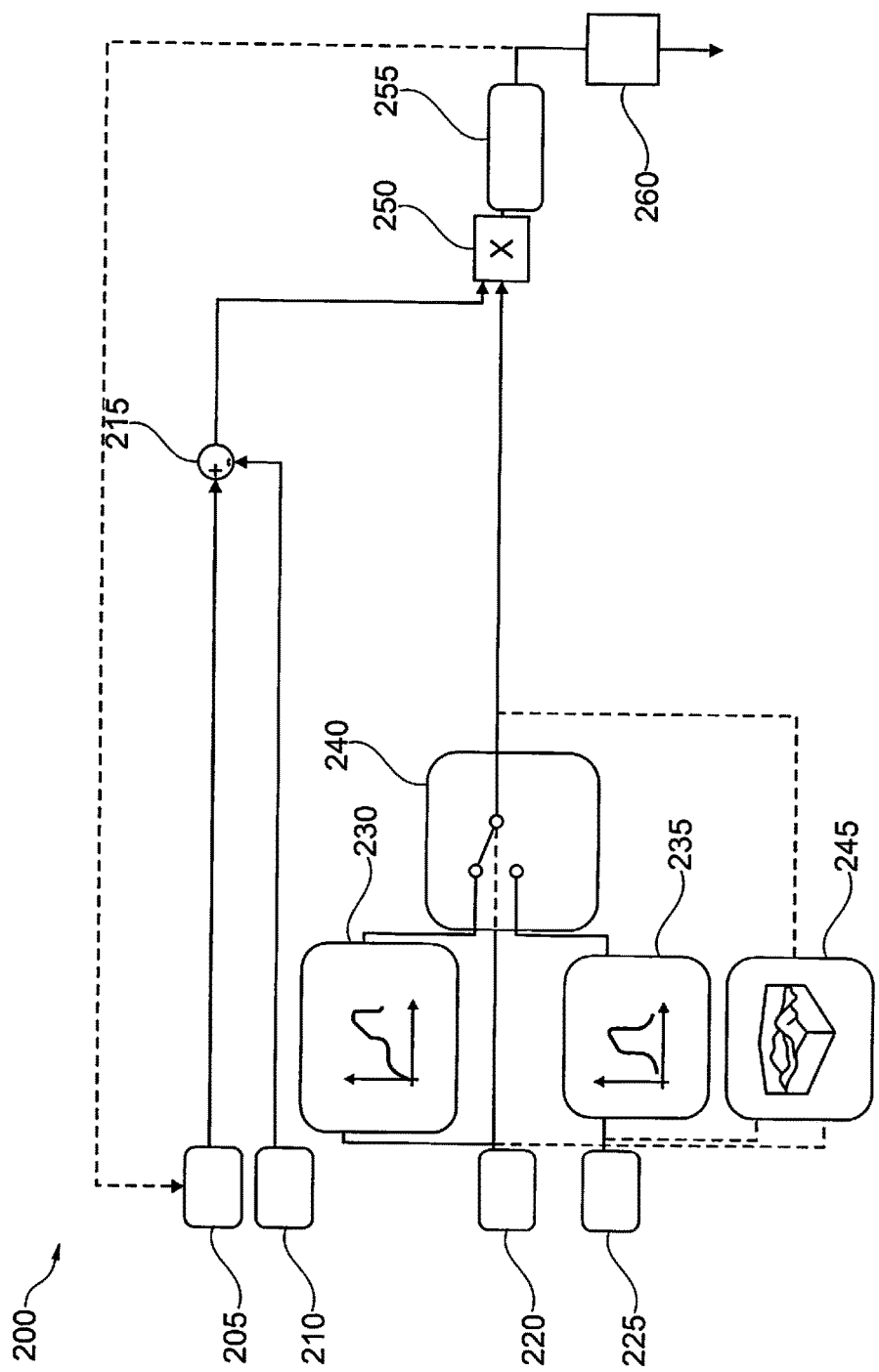
FIG. 2 is a flow chart of a method for determining the clutch temperature.

FIG. 2 shows a flow chart 200 of a method for determining the temperature of the clutch 120 of the hybrid drive 105 of FIG. 1. The method shown by flow chart 200 is set up in particular to be carried out by the processing device 155 of the arrangement 150. In first step 205, the temperature of the clutch 120 is initially determined. To that end, the clutch temperature can in particular be determined or estimated indirectly, for example on the basis of the temperature of the clutch housing 125, which is determined in step 210. For example, after a predetermined stand-still phase of the hybrid drive 105 the clutch temperature can correspond to the temperature of the clutch housing 125. In one embodiment, the clutch temperature is initially determined or estimated by means of the device 175. In subsequent step 215, the difference between the temperatures of the clutch 120 and the clutch housing 125 is determined.

In step 220, the speed of the first drive motor 110 is determined, and in step 225, the speed of a second drive motor 115 is determined. The speed determinations can be carried out in particular by means of the sensing devices 160 and 165. In step 230, a first heat conductivity value is determined on the basis of the speed of the first drive motor 110, and in step 235, a second heat conductivity value is determined on the basis of the speed of the second drive motor 115. The heat conductivities each relate to heat transfer that takes place between the clutch 120 and the clutch housing 125.

To select the heat conductivity to be used, step 240 checks whether the first drive motor 110 is in operation. To that end, the speed determined in step 220 can in particular be compared to a threshold value, which is lower than an idle speed of the first drive motor 110. In a different embodiment, that threshold value is 0. If it has been determined that the first drive motor 110 is in operation, then the first heat conductivity is used, otherwise the second heat conductivity is used.

In a different embodiment, which is indicated by broken lines, the steps 230, 235, and 240 are replaced by step 245, in which the heat conductivity is determined by means of a two-dimensional characteristic map on the basis of the speeds determined in steps 220 and 225.

The heat conductivity value is a material property of a medium that is present between the clutch 120 and the clutch housing 125, and that is preferably a gaseous medium.

However, the heat conductivity value is also influenced by circulation of the medium within the clutch housing, which circulation takes place more effectively in particular if the clutch 120 is rotating relative to the clutch housing 125. The higher the clutch rotational speed, therefore, the more accurate is the heat conductivity value.

On the basis of the ascertained heat conductivity value, in step 250 the heat flow between the clutch 120 and the clutch housing 125 is determined. That heat flow determination is made on the basis of the product of the ascertained heat conductivity value and the ascertained temperature difference value. Additional parameters can also be taken into account. In particular, parameters whose values are fixed by the architecture of the clutch 120 and of the clutch housing 125 can be taken into account. Those values can include the distance between the clutch 120 and the clutch housing 125, an effective exchange surface, or the heat capacities of the clutch 120 or of the clutch housing 125. Those parameters can also be summarized by a single constant and can be incorporated into the product of the heat conductivity value and the temperature difference value.

In step 255, the temperature of the clutch 120 that was ascertained in step 205 is then adjusted on the basis of the ascertained heat flow. In one embodiment, the adjusted temperature value is used in step 205 as an improved starting value for the temperature of the clutch 120 when the method 200 runs again.

The adjusted clutch temperature value provided in step 255 can be compared in step 260 to a threshold value, in which case an output signal can be omitted if the clutch temperature is above the threshold value. That makes it possible to indicate an overheated clutch.

Figure 3:
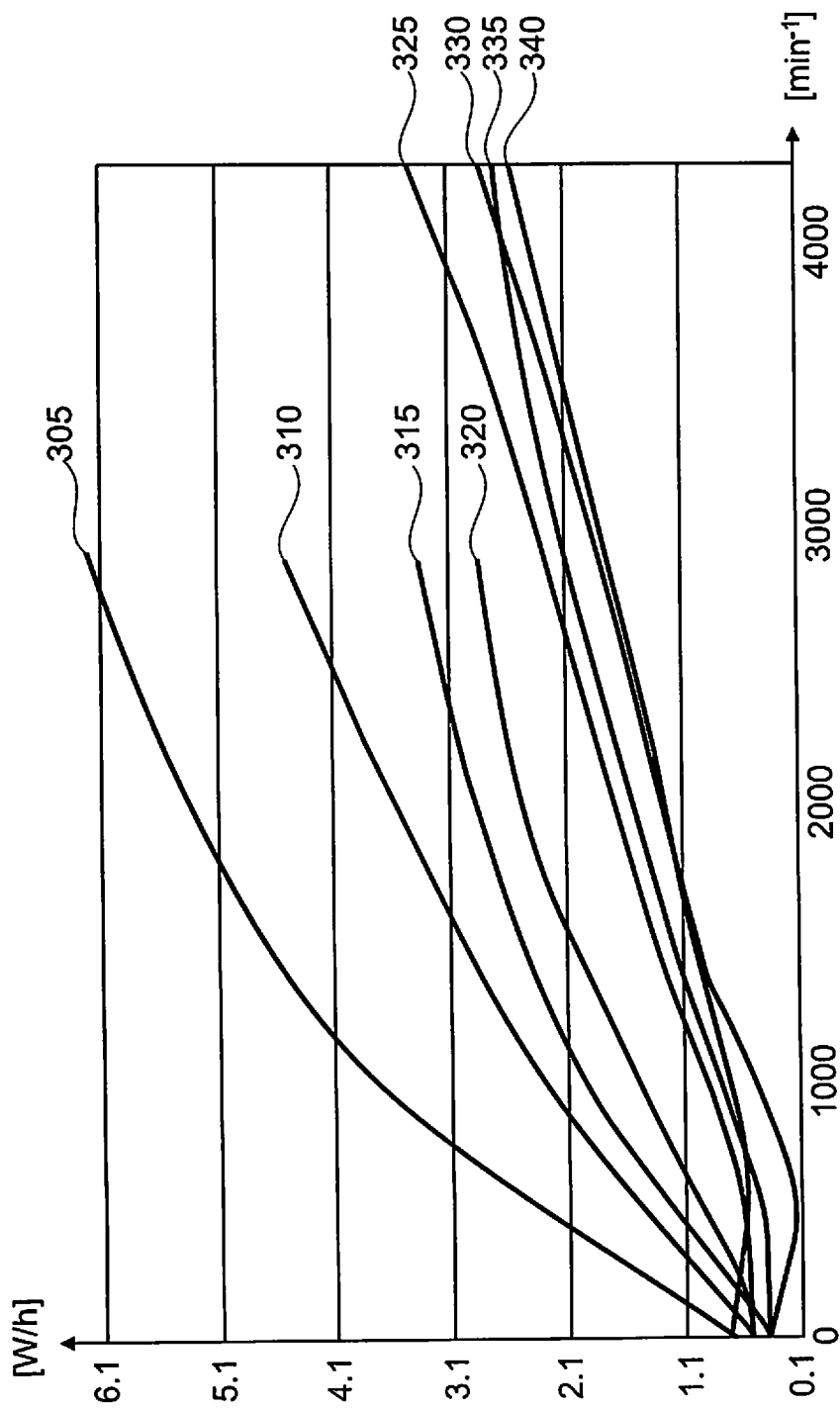
FIG. 3 shows examples of correlations between rotational speed and heat conductivity between the clutch and the clutch housing.

FIG. 3 shows examples of correlations between rotational speed and heat conductivity values between the clutch 120 and the clutch housing 125. Plotted along the horizontal axis direction is the rotational speed of the clutch 120, and plotted along the vertical axis direction the heat conductivity value.

Curves 305 through 320 relate to the operation of the first drive motor 110. Curves 325 through 340 relate to the operation of the hybrid drive 105 in which the first drive motor 110 is not operating and propulsion occurs by means of the second drive motor 115. It is clear that curves 325 through 340 differ from curves 305 through 320 by pairs. Differences between the respective curves correspond to an error that would enter into the determination of the adjusted temperature of the clutch 120. That error would arise if the rotation of the clutch 120 on the basis of the motion of the second drive motor 115 were not considered when operating the hybrid drive 105 while the first drive motor 110 is not running.

Figure 4:
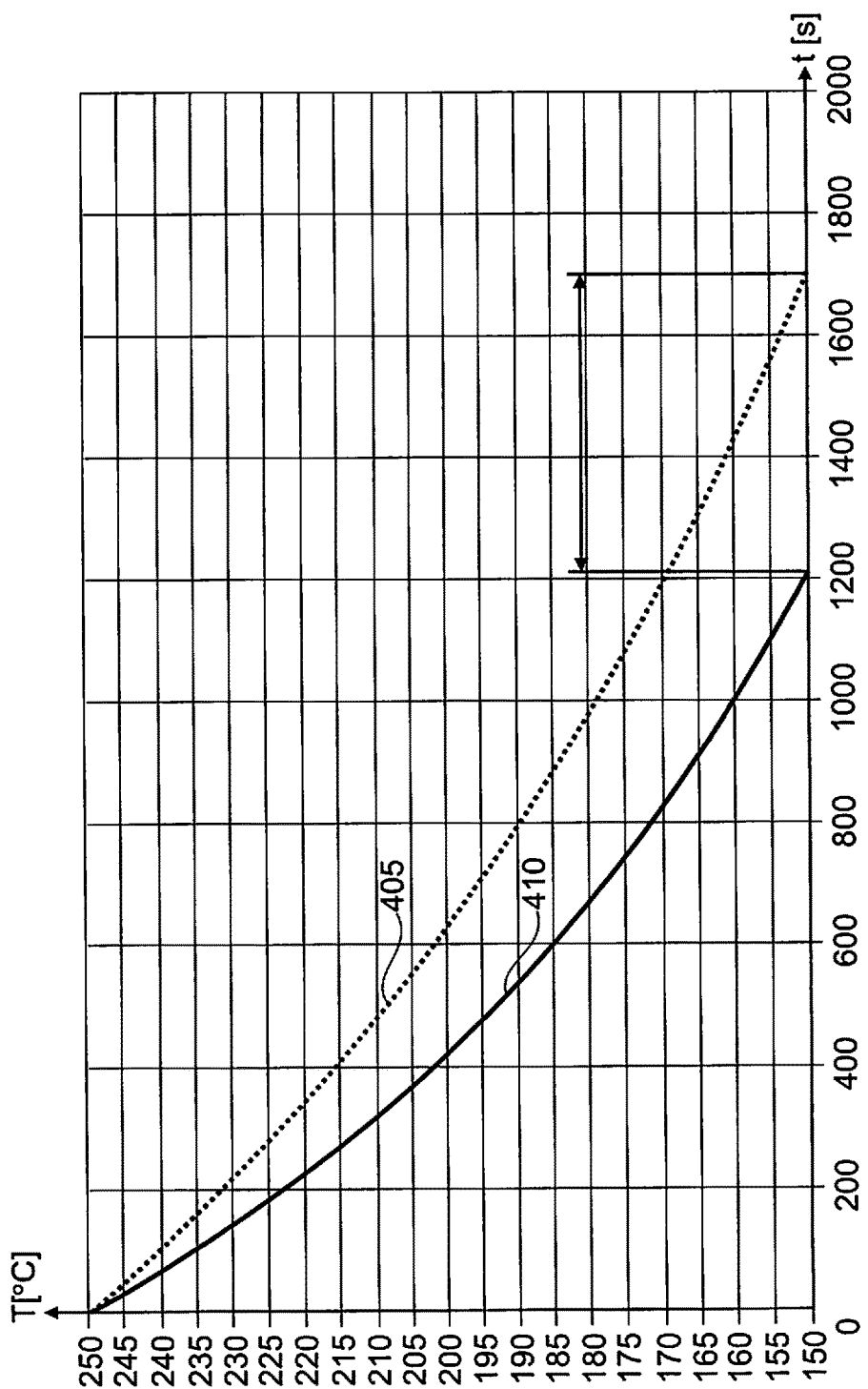
FIG. 4 is an exemplary temperature diagram of a cooling clutch in the hybrid drive shown in FIG. 1.

FIG. 4 illustrates that connection. In the horizontal axis direction time is plotted, and in the vertical axis direction the temperature of the clutch 120. A first, dotted line curve 405 relates to a temperature determination of the clutch 120 during cooling, without considering its rotation, as it cools from a temperature of 250° C. to 150° C. That process requires approximately 1700 seconds. A second, solid line curve 410 relates to the same cooling interval while considering the clutch rotation according to method 200 of FIG. 2, for which approximately 1200 seconds are required, i.e., approximately 500 seconds less than according to the first curve 405. The results of the second curve 410 and of the temperature determination according to method 200 come closer to actually observed temperatures of the clutch 120 than the temperatures of the first curve 405. The two curves make it clear that the rotation of the clutch 120 has a significant role in shaping the temperature, and it should not be ignored.

The experiment is based on the following boundary conditions: travel of a motor vehicle that is propelled by the drive train 100 on the basis of only the second drive motor 115, at a constant speed of approximately 10 km/h, the temperature of the transmission 135 is constant at 90° C.; the temperature of the surroundings of the clutch housing 125 is constant at 20° C.; the temperature of the transmission housing 125 at time 0 is 100° C.; the speed of the first drive motor 110 is 0; the speed of the shaft 130 is constant at 1750 rpm, and the speed of the second input shaft 140 is constant at 850 rpm.

What is claimed is:

1. A method for determining a temperature of a clutch in a hybrid drive having a first drive motor coupled by the clutch to a shaft, and a second drive motor coupled rigidly to the shaft, and said method comprising the following steps:
    determining an initial temperature value of the clutch;
    determining a temperature value of a clutch housing containing the clutch;
    determining a temperature difference between the initial temperature value of the clutch and the temperature value of the clutch housing;
    determining a heat conductivity value representing a heat conductivity between the clutch and the clutch housing, wherein the heat conductivity value is determined as a function of a speed of the first drive motor and a speed of the second drive motor;
    determining a heat flow between the clutch and the clutch housing as a function of a product of the heat conductivity value and the temperature difference between the initial temperature value of the clutch and the temperature value of the clutch housing; and
    updating the initial temperature value of the clutch as a function of the determined heat flow.

2. The method according to claim 1, including the step of determining the heat conductivity value from a characteristic map based upon the speeds of the first and the second drive motors.

3. The method according to claim 2, including the step of determining that the first drive motor is in operation by detecting whether its speed is greater than a predetermined speed value.

4. The method according to claim 1, including the step of determining the heat conductivity value as a function of the speed of the first drive motor when the first drive motor is in operation, and when the first drive motor is not in operation determining the heat conductivity value as a function of the speed of the second drive motor.

5. The method according to claim 1, including the step of repeating the method multiple times to determine the temperature of the clutch repeatedly.

6. The method according to claim 1, including the step of emitting a signal when the updated initial temperature value of the clutch is higher than a predetermined threshold clutch temperature value.

7. The method according to claim 1, including the step of providing a gaseous medium between the clutch and the clutch housing.

8. The method according to claim 1, including the step of providing a dual clutch and determining a clutch temperature of at least one of the clutches of the dual clutch.

9. A computer program comprising: program code configured to execute the method according to claim 1 by storing and executing a computer program product in one of a processing device and a computer-readable data medium.

10. A device for determining a temperature of a clutch in a hybrid drive having a first drive motor coupled by the clutch to a shaft, and a second drive motor coupled rigidly to the shaft, said temperature determining device comprising:
- a temperature sensor for determining an initial temperature value of the clutch;
- a temperature sensor for determining a temperature value of a clutch housing within which the clutch is housed;
- a first speed sensor for determining a speed of the first drive motor;
- a second speed sensor for determining a speed of the second drive motor;
- a processing device for:
  - determining a temperature difference between the initial temperature value of the clutch and the temperature value of the clutch housing;
  - determining a heat conductivity value representing a heat conductivity existing between the clutch and the clutch housing, wherein the heat conductivity value is a function of the speed of the first drive motor and the speed of the second drive motor;
  - determining a heat flow that takes place between the clutch and the clutch housing based upon a product of the heat conductivity value and the temperature difference between the initial temperature value of the clutch and the temperature value of the clutch housing; and
  - updating the initial temperature value of the clutch as a function of the determined heat flow.

* * * * *